(12) United States Patent
Kruger et al.

(10) Patent No.: US 7,819,700 B2
(45) Date of Patent: Oct. 26, 2010

(54) TERMINAL CONNECTION APPARATUS FOR BATTERY CELLS HAVING FOIL TERMINALS

(75) Inventors: Duane D. Kruger, Westfield, IN (US); Robert C. Beer, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 135 days.

(21) Appl. No.: 12/316,000

(22) Filed: Dec. 9, 2008

(65) Prior Publication Data

US 2010/0144214 A1    Jun. 10, 2010

(51) Int. Cl.
*H01R 24/00* (2006.01)

(52) U.S. Cl. .................. 439/627; 439/500; 439/513; 429/158

(58) Field of Classification Search .............. 439/500, 439/627, 513, 507; 429/158, 160
See application file for complete search history.

(56) References Cited

U.S. PATENT DOCUMENTS

| | | | |
|---|---|---|---|
| 5,709,965 | A | 1/1998 | Grivel et al. |
| 6,423,441 | B1 * | 7/2002 | Ronning et al. ............... 429/82 |
| 7,179,562 | B2 * | 2/2007 | Zolotnik et al. ............. 429/211 |
| 7,270,576 | B2 * | 9/2007 | Kim et al. .................... 439/627 |
| 7,291,422 | B2 * | 11/2007 | Oogami et al. ............... 429/152 |
| 7,294,020 | B2 * | 11/2007 | Zhao et al. .................... 439/627 |
| 7,364,456 | B2 * | 4/2008 | Yeh et al. ..................... 439/500 |
| 7,507,124 | B2 * | 3/2009 | Kim ............................ 439/627 |

FOREIGN PATENT DOCUMENTS

WO    WO 2007/107036    9/2007

OTHER PUBLICATIONS

European Search Report dated Mar. 17, 2010.

\* cited by examiner

*Primary Examiner*—Xuong M Chung-Trans
(74) *Attorney, Agent, or Firm*—Jimmy L. Funke

(57) ABSTRACT

A pressure connection apparatus includes a conductive spring member having first and second end portions that are curved, and first and second retaining members having curved pockets that are oppositely oriented for receiving the first and second curved ends of the conductive spring member. An aluminum foil terminal of one battery is sandwiched between the conductive spring and the pocket of the first retaining member, while a copper foil terminal of another battery is sandwiched between the conductive spring and the pocket of the second retaining member. The spring member is clad with aluminum on one side and copper on the other, and the end portions are oppositely curved so that the aluminum-clad side contacts the aluminum foil terminal within the pocket of the first retaining member, and the copper-clad side contacts the copper foil terminal within the pocket of the second retaining member.

9 Claims, 5 Drawing Sheets

TERMINAL CONNECTION APPARATUS FOR BATTERY CELLS HAVING FOIL TERMINALS

TECHNICAL FIELD

The present invention relates to high-voltage battery packs comprising a number of battery cells interconnected in a series or series-parallel arrangement, and more particularly to a terminal connection apparatus for interconnecting battery cells that have metal foil terminals.

BACKGROUND OF THE INVENTION

High-voltage battery packs are constructed by co-packaging a number of individual battery cells or modules, and interconnecting the positive and negative terminals of the cells or modules in a series or series-parallel arrangement. Lithium-ion batteries are particularly attractive for such applications because of their low weight and high power density, and because of their relatively high cell voltage, which minimizes the number of terminal connections in the battery pack.

To minimize cost, individual lithium-ion battery cells can be manufactured in the form of a soft package with metal foil terminals, as illustrated in FIG. 1. Referring to FIG. 1, the cell 10 has laterally-staggered aluminum-foil and copper-foil terminals 12 and 14, and is sealed in an envelope 16 of metalized plastic.

Although two or more foil battery terminals can be electrical joined by ultrasonic welding (high temperature welding processes are impractical due to the plastic cell construction), pressure connections are generally preferred so that failed or damaged cells of the battery pack can be replaced with new cells. For example, the patent document WO 2007/107036A1, published on Sep. 27, 2007, shows a soft package lithium ion battery pack 1 in which the foil terminals 4 of individual battery cells 3 are bolted to bus bars 2. However, bolted pressures connections such as those shown in the aforementioned patent document can be problematic for several reasons, including galvanic corrosion due to joining dissimilar metals, open-circuiting due to loose connections, and short-circuiting due to stray mounting hardware. Additionally, bolted pressure connections concentrate the battery current over a relatively small portion of the terminal area. Accordingly, what is needed is a pressure connection apparatus that more efficiently and more reliably interconnects the metal foil terminals of soft package battery cells within a battery pack.

SUMMARY OF THE INVENTION

The present invention is directed to an improved pressure connection apparatus for connecting an aluminum foil terminal of a first battery cell to a copper foil terminal of a second battery cell. The connection apparatus includes a conductive spring member having first and second end portions that are curved, and first and second retaining members having curved pockets that are oppositely opposed for receiving the first and second curved ends of the conductive spring member. The aluminum foil terminal is sandwiched between the conductive spring and the inner periphery of the pocket of the first retaining member, while the copper foil terminal is sandwiched between the conductive spring and the inner periphery of the pocket of the second retaining member. The spring member is clad with aluminum on one side and copper on the other, and the end portions are oppositely curved (i.e., in the form of the letter S) so that the aluminum-clad side contacts the aluminum foil terminal within the pocket of the first retaining member, and the copper-clad side contacts the copper foil terminal within the pocket of the second retaining member. A conductive post formed on the conductive spring member intermediate the first and second ends is accessed by a probe to detect battery cell voltages.

DESCRIPTION OF THE PREFERRED EMBODIMENT

Figure 2:
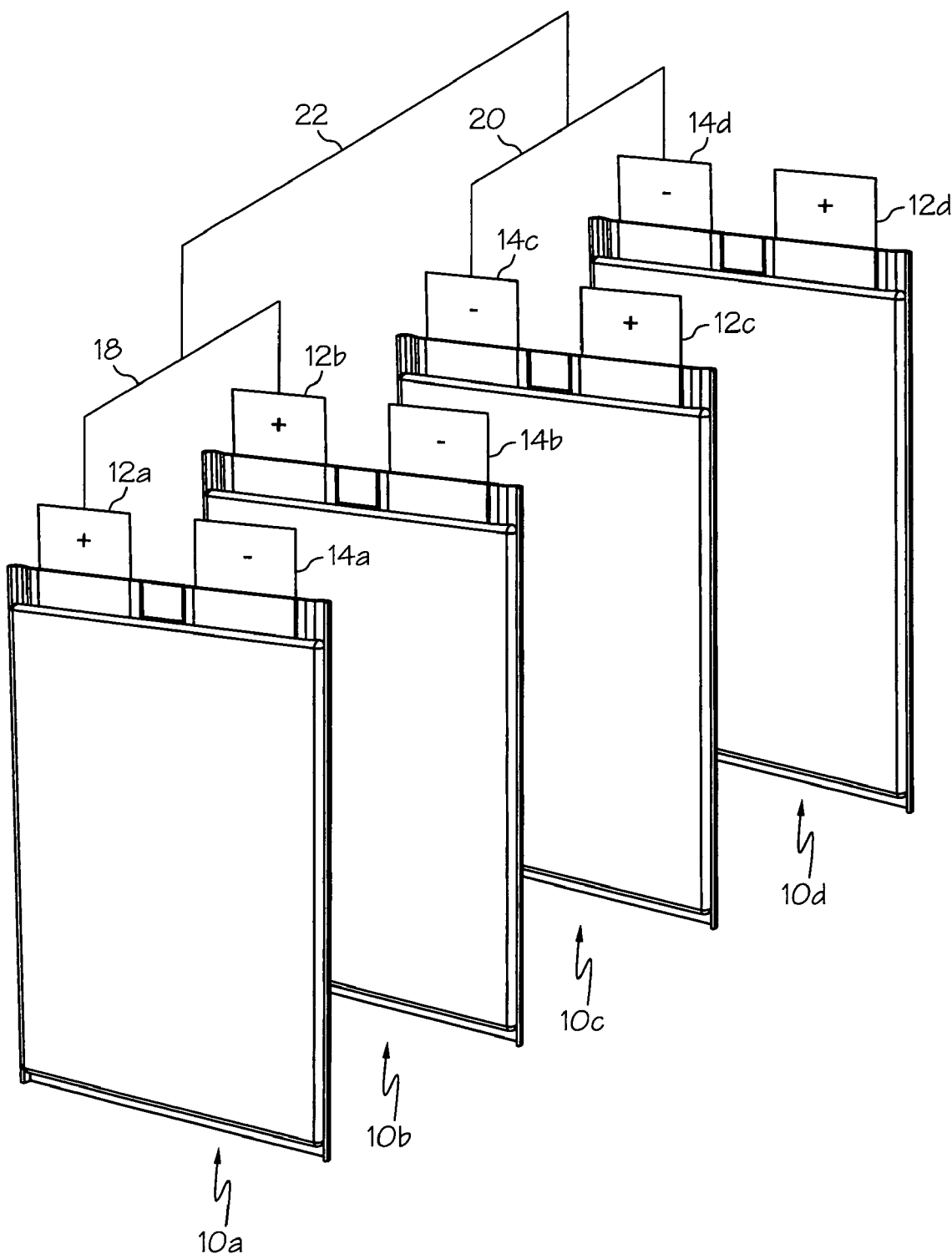
FIG. 2 is a conceptual view of a portion of a battery pack including four battery cells of the type depicted in FIG. 1.

The connection apparatus of the present invention is disclosed herein in the context of a high-voltage battery pack comprising many individual battery cells that are co-packaged and electrically interconnected in a series or series-parallel configuration. FIG. 2 illustrates an exemplary series-parallel arrangement in which pairs of parallel-connected battery cells are connected in series. Referring to FIG. 2, the battery pack cells 10a-10d can be oriented as shown to enable in-line battery terminal connections, as indicated for example by the conductors 18-22. The conductor 18 interconnects the aluminum anode terminals 12a, 12b of cells 10a, 10b; the conductor 20 interconnects the copper cathode terminals 14c, 14d of cells 10c, 10d; and the conductor 22 interconnects the conductors 18 and 20. Although not shown in FIG. 2, like sets of conductors are provided for interconnecting the copper cathode terminals 14a, 14b of cells 10a, 10b, for interconnecting the aluminum anode terminals 12c, 12d of cells 10c, 10d, for linking the interconnected cathode terminals 14a, 14b to another pair of cells (or a battery pack terminal), and for linking the interconnected anode terminals 12c, 12d to yet another pair of cells (or a battery pack terminal).

The present invention is directed to a novel pressure connection apparatus for implementing the functionality of the conductors 18-22 of FIG. 2, and like sets of interconnecting conductors. Using a pressure connection, as opposed to welding for example, is desirable because the connections can be unfastened at the factory or in a repair facility to facilitate replacement of individual battery cells if desired. And significantly, the pressure connection apparatus of the present invention does not involve the use of internal fasteners such as nuts and bolts that can loosen due to vibration. A second, equally important, advantage of the present invention is the virtual eliminative of galvanic corrosion due to juxtaposition of aluminum foil terminals with copper connectors and/or copper foil terminals with aluminum connectors.

Figure 1:
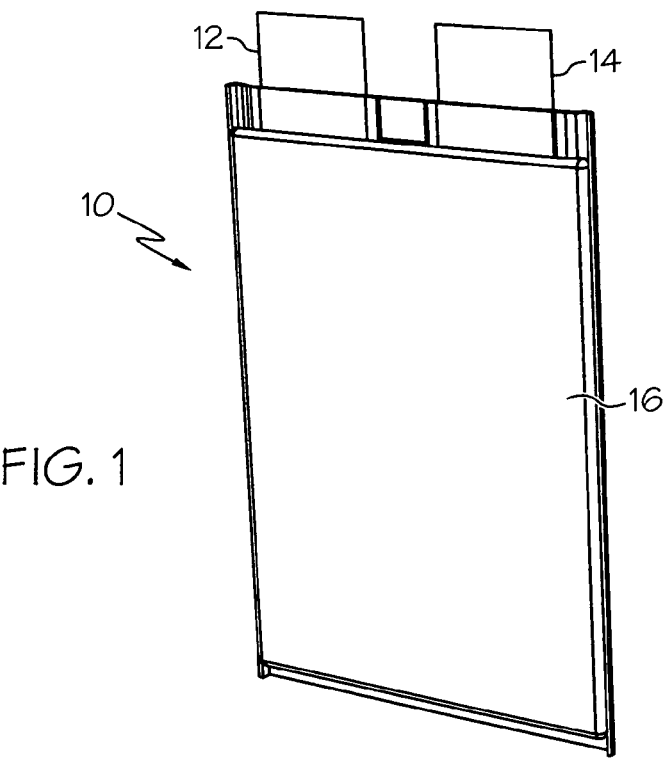
FIG. 1 is an illustration of a soft package lithium-ion battery having laterally-staggered aluminum-foil and copper-foil terminals.
Figure 3:
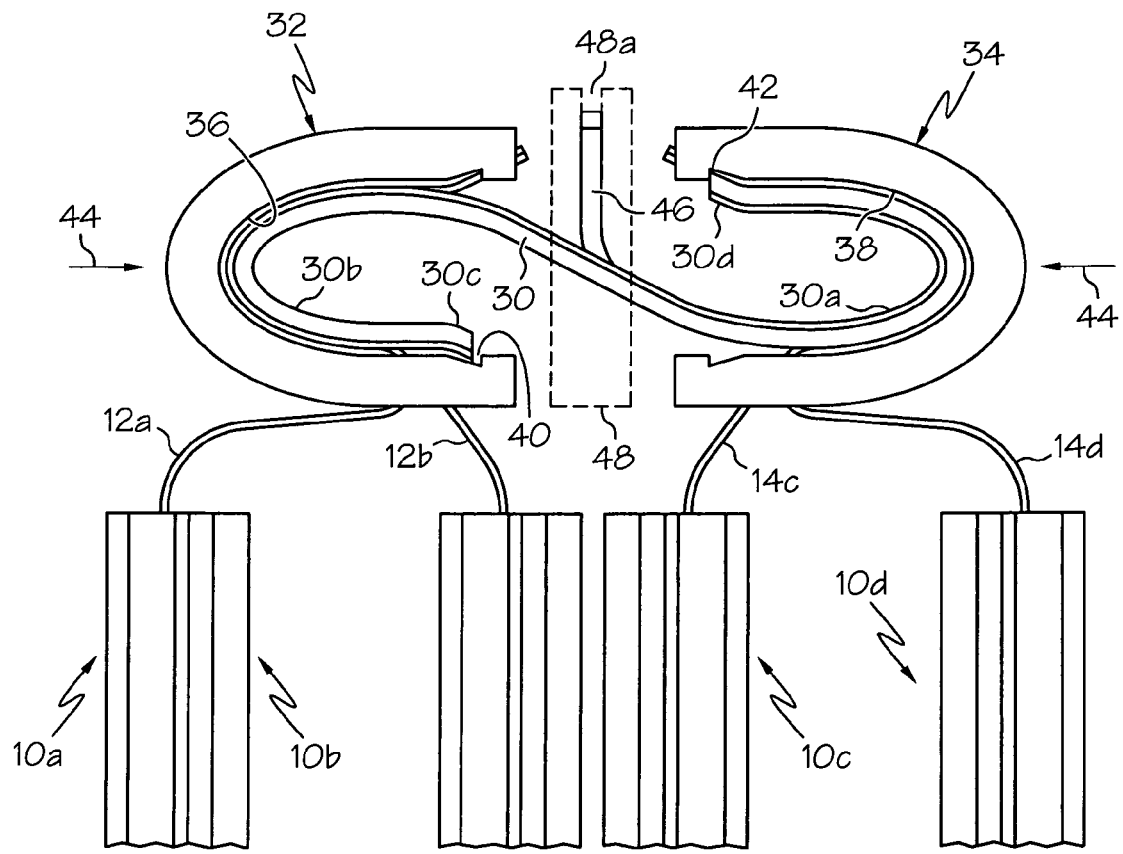
FIG. 3 illustrates the terminal connection apparatus of the present invention, as applied to the four battery cells of FIG. 2.

Referring to FIG. 3, the above-mentioned attributes are achieved according to this invention by the novel combination of a conductive spring member 30 and a pair of retaining members 32, 34. The spring member 30 is a rectangular piece of copper, clad on one side with aluminum, and fashioned in the shape of the letter S—that is, with oppositely curved end portions 30a, 30b. In this way, the exterior periphery of end portion 30a is copper, and the exterior periphery of end portion 30b is aluminum. The retaining members 32 and 34 can be formed of any suitable material, and each is provided with a pocket 36, 38 similar in profile to the curved end portions 30a, 30b of the spring member 30. The retaining members 32, 34 are arranged above the battery cells 10a-10d, in opposed orientation so that the pockets 36 and 38 face each other. The aluminum foil anode terminals 12a, 12b of cells 10a, 10b are routed into the pocket 36 of retaining member 32, and the aluminum-clad end portion 30b of spring member 30 is pressed into the pocket 36, thereby forming a pressure connection in which the aluminum foil terminals 12a and 12b are sandwiched between the inner periphery of pocket 36 and the aluminum exterior periphery of spring member 30. In like manner, the copper foil cathode terminals 14c, 14d of cells 10c, 10d are routed into the pocket 38 of retaining member 34, and the copper end portion 30a of spring member 30 is pressed into the pocket 38, thereby forming a pressure connection in which the copper foil terminals 14c and 14d are sandwiched between the inner periphery of pocket 38 and the copper exterior periphery of spring member 30.

The ends 30c, 30d of the spring member 30 are bent outward as shown to engage notches 40, 42 formed on the inner peripheries of the pockets 36 and 38. This maintains the position of the end portions 30a, 30b in the pockets 36, 38 when the retaining members 32 and 34 are mechanically biased together as indicated by the arrows 44.

Figure 4:
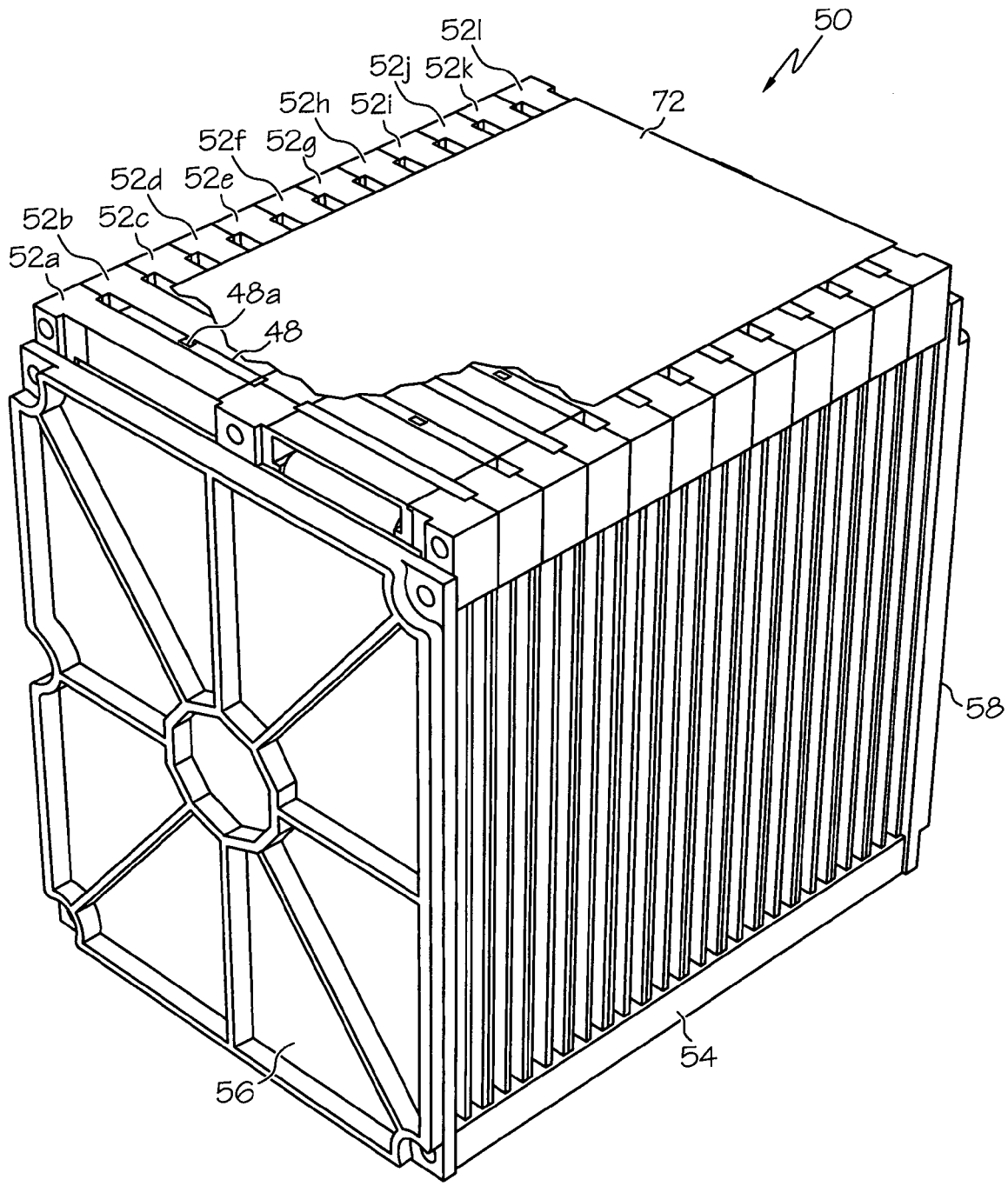
FIG. 4 is an isometric illustration of a battery pack implementing the terminal connection apparatus of FIG. 3.
Figure 5:
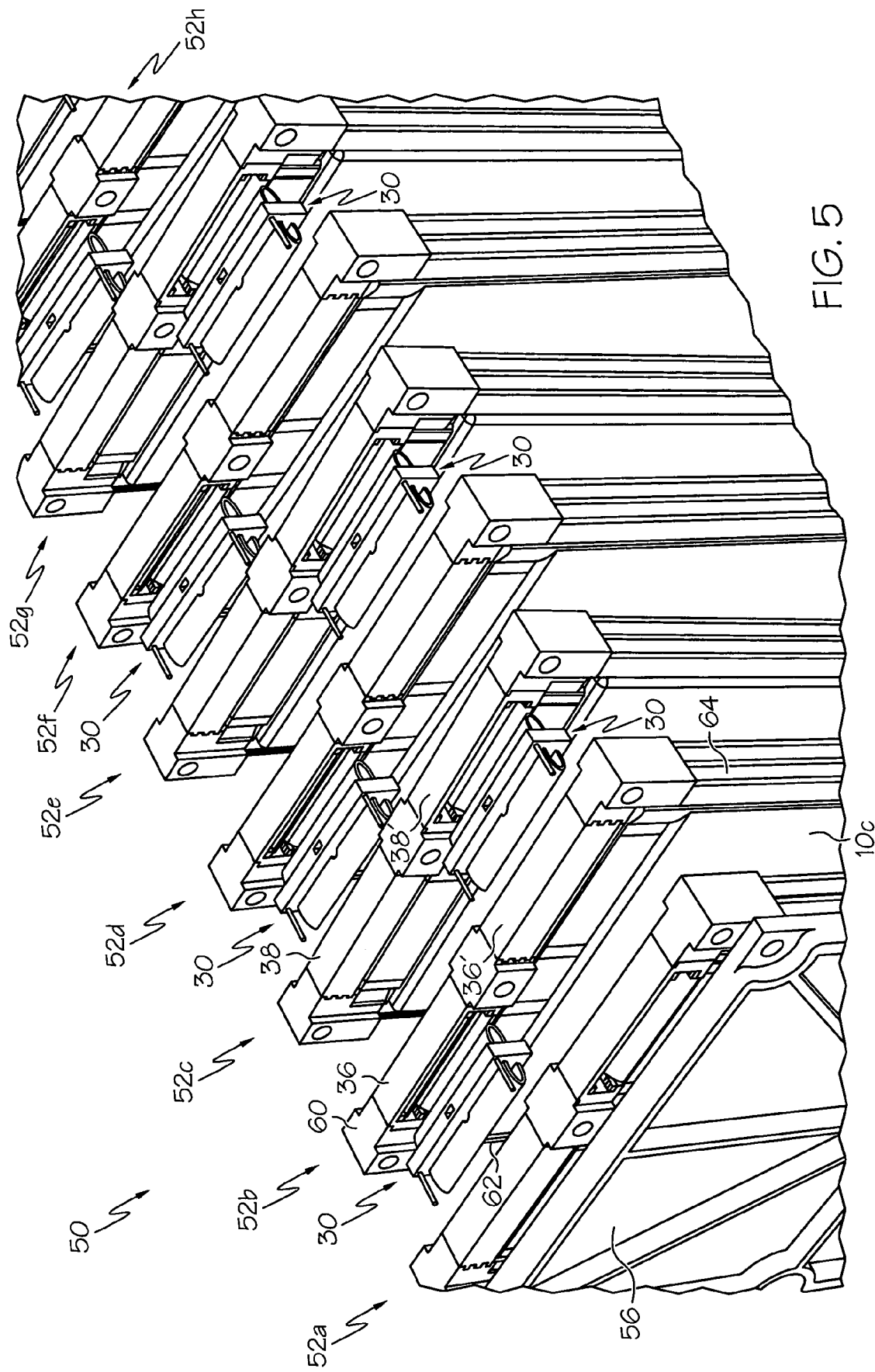
FIG. 5 is an exploded isometric view of a portion of the battery pack of FIG. 4.
Figure 6:
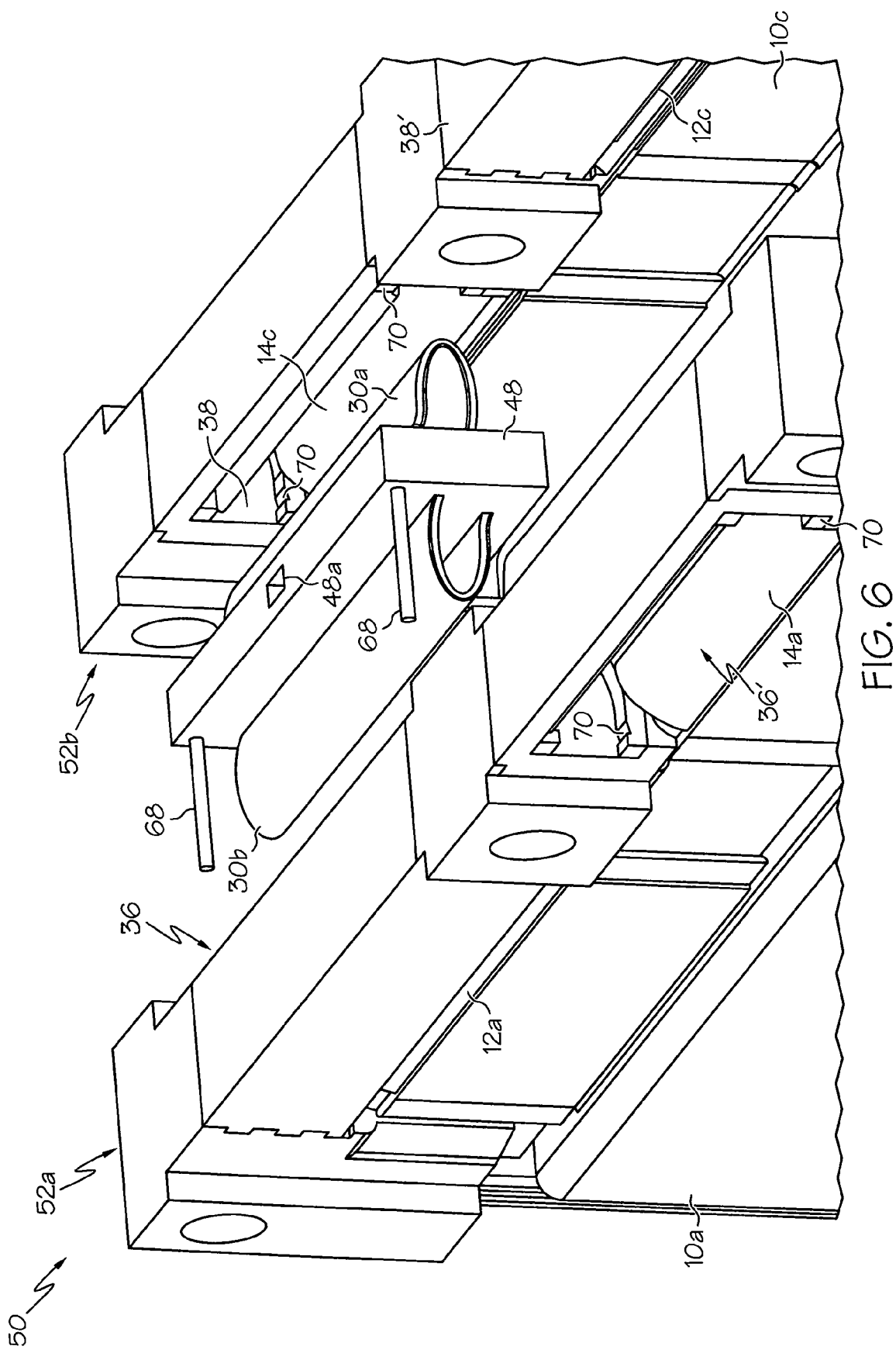
FIG. 6 is an enlarged view of a portion of the isometric view of FIG. 5.

As also illustrated in FIG. 3, the portion of spring member 30 intermediate the end portions 30a and 30b is selectively cut and bent to form a post 46 that extends upward, away from the battery cells 10a-10d. As illustrated in FIGS. 4-6, the posts of the various spring members within a battery pack are contacted by probes for the purpose of measuring cell voltages within the battery pack. Alternately, of course, the post 46 may be formed by bonding a separate conductive element to the spring member 30. And finally, the post 46 and the intermediate portion of spring member 30 may be over-molded with a block of insulating material 48 such as plastic resin, with a suitable opening 48a for probe access to the over-molded post 46. This facilitates manipulation of the spring member 30, and can be used to provide a one-way fit that assures proper assembly orientation, as described below in reference to FIGS. 4-6.

FIGS. 4-6 depict an exemplary battery pack 50 incorporating the pressure connection apparatus of the present invention. As with the embodiments of FIGS. 2-3, the battery pack 50 includes multiple pairs of parallel-connected battery cells that are connected in series. Specifically, the illustrated arrangement includes twelve pairs of parallel-connected battery cells, oriented substantially as depicted in FIG. 2 with respect to the four battery cells 10a-10d. Since the nominal cell voltage of a lithium-ion battery is 4 VDC, the illustrated arrangement provides a nominal battery pack voltage of 48 VDC. Of course, multiple battery packs 50 may be combined in series, parallel, or series-parallel arrangements to provide a desired overall voltage and current-capability.

Referring to FIGS. 4-6, the battery pack 50 comprises a stack of twelve identical cell modules 52a, 52b, 52c, 52d, 52e, 52f, 52g, 52h, 52i, 52j, 52k, 52l supported on an insulative base 54, and sandwiched between a pair of insulative end plates 55, 56. The end plates 55, 56 and each of the cell modules 52 are drilled so that the assembly may be bolted together; this not only holds the components in place, but also provides a compressive force as represented by the arrows 44 in FIG. 3 for augmenting the contact pressure between the spring member 30 and the respective foil terminals.

As illustrated with respect to the cell module 52b of FIG. 5, each cell module comprises two juxtaposed battery cells (such as cells 10c and 10d of FIGS. 2-3) mounted in a rigid peripheral frame. The frame includes a molded cap 60 into which the foil terminals of the battery cells are received, and a pair of finned metal heat sinks 62, 64 that depend downwardly from the ends of the molded cap 60. As best seen in FIG. 6, two oppositely facing pockets 36, 36'/38, 38' are formed in the molded cap 60 of each frame; and each frame is laterally flipped relative to its neighboring frames so that any two neighboring frames present a pair of oppositely disposed pockets 36, 38 as conceptually depicted in FIG. 3. And as illustrated most clearly in FIG. 5, this arrangement alternates the oppositely disposed pockets between the left and right sides of the battery pack 50. For example, the oppositely disposed pockets 36, 38 of neighboring cell modules 52a and 52b are on the left-side of the battery pack 50 (as viewed in FIG. 5), the oppositely disposed pockets 36', 38' of neighboring cell modules 52b and 52c are on the right-side of the battery pack 50, and so on.

The pockets 36, 36'/38, 38' of a given frame cap 60 are vertically aligned with the foil terminals of their respective battery cells, and the foil terminals extend into the aligned pockets through slots (not shown) formed in the base of the cap 60. Referring to FIGS. 2 and 6, for example, the aluminum anode terminals 12a, 12b of cells 10a, 10b are routed into a rearward-facing pocket 36 of cell module 52a, while the copper cathode terminals 14a, 14b are routed into a forward-facing pocket 36'. And similarly, the copper cathode terminals 14c, 14d of cells 10c, 10d are routed into a forward-facing pocket 38 of cell module 52b, while the aluminum anode terminals 12c, 12d are routed into a rearward-facing pocket 38'.

A spring member 30 is interposed between each pair of oppositely disposed pockets 36, 38/36', 38' within the battery pack 50, as best seen in FIGS. 5-6. A pair of posts 68 protrude from one side of the over-molded plastic resin 48 and are received in openings formed in one of the cell frames; this serves to hold the spring member 30 in place during assembly, as well as to ensure that each spring member 30 is oriented correctly—that is, so that the end portion 30a contacts the copper foil cell terminals, and the end portion 30b contacts the aluminum foil cell terminals. A set of notched metal rings 70 are insert molded into the ends of the pockets 36, 38/36', 38' to provide the function of the retaining member notches 40, 42 described above in respect to FIG. 3.

Finally, the frame caps 60 are undercut so that the interposed spring members 30 nest between neighboring cell frames 52, exposing the top of the over-molded resin 48 as seen in FIG. 4. FIG. 4 additionally shows a printed circuit board 72 mounted atop the battery pack 50 for detecting cell voltages within the battery pack 50. To this end, the circuit board 72 is provided with a matrix of downwardly depending voltage probes (not shown) that extend into the openings 48a in the over-molded material 48 of each spring member 30 and electrically contact the underlying posts 46. Although not shown in FIG. 4, circuits for measuring and processing the detected cell voltages may also be mounted on the circuit board 72.

In summary, the pressure connection apparatus of the present invention provides an improved way of electrically coupling two or more metal foil terminals to form a reliable and cost-effective high voltage battery pack incorporating multiple such connections. The pressure connection is formed over a substantial area of the foil terminal to provide a low-resistance electrical connection, and galvanic corrosion due to dissimilar metal interfacing is virtually eliminated. While the apparatus of the present invention has been described in reference to the illustrated embodiment, it should be understood that various modifications in addition to those mentioned above will occur to persons skilled in the art. For example, the connection apparatus may be applied to battery cells having foil terminals that are plated with another metal such as tin or brass, the spring member 30 and/or pockets 36, 38 may be provided with surface features such as ribs or dimples that establish focused points of contact, the spring member 30 may have a shape other than an S-shape, and so forth. Accordingly, it is intended that the invention not be limited to the disclosed embodiment, but that it have the full scope permitted by the language of the following claims.

The invention claimed is:

1. A pressure connection apparatus for electrically connecting a metal foil anode terminal of a first battery cell to a metal foil cathode terminal of a second battery cell, the apparatus comprising:
    a conductive spring member having first and second end portions;
    a first retaining member having a first pocket in which the foil anode terminal and the first end portion of the conductive spring member are received, the foil anode terminal being sandwiched between the first end portion of the conductive spring member and an interior periphery of said first pocket; and
    a second retaining member having a second pocket in which the foil cathode terminal and the second end portion of the conductive spring member are received, the foil cathode terminal being sandwiched the second end portion of the conductive spring member and an interior periphery of said second pocket.

2. The pressure connection apparatus of claim 1, where:
    the first and second end portions of said conductive spring member are curved; and
    the interior peripheries of said first and second pockets are curved to engagingly receive the curved end portions of said conductive spring member.

3. The pressure connection apparatus of claim 1, where the foil anode terminal is formed of a first metal and the foil cathode terminal is formed of a second metal that is dissimilar to the first metal, and where:
    said conductive spring member has a first surface formed of said first metal that contacts said foil anode terminal, and a second surface formed of said second metal that contacts said foil cathode terminal.

4. The pressure connection apparatus of claim 1, where the foil anode terminal is formed of a first metal and the foil cathode terminal is formed of a second metal that is dissimilar to the first metal, and where:
    said conductive spring member has a first major surface clad with said first metal and a second major surface clad with said second metal; and
    the first and second end portions of said conductive spring member are oppositely curved such that said first major surface contacts said foil anode terminal within said first pocket, and said second major surface contacts said foil cathode terminal within said second pocket.

5. The pressure connection apparatus of claim 4, where:
    the interior peripheries of said first and second pockets are curved to engagingly receive the oppositely curved end portions of said conductive spring member.

6. The pressure connection apparatus of claim 1, further comprising:
    a conductive post extending out of said conductive spring member intermediate said first and second end portions in a direction away from said battery cells to provide a voltage tap for detecting a battery cell voltage.

7. The pressure connection apparatus of claim 6, where:
    said conductive post and a portion of said spring member intermediate said first and second end portions are overmolded with an insulative material in which an opening is formed to provide probe access to said conductive post.

8. The pressure connection apparatus of claim 1, where:
    said first and second retaining members are arranged in opposed orientation so that the first and second pockets face each other.

9. The pressure connection apparatus of claim 8, further comprising:
    means for mechanically biasing said first and second retaining members toward each other so as to hold the first and second end portions of said conductive spring member within said first and second pockets, and to augment a contacting force between said end portions and respective foil terminals.

* * * * *